(12) United States Patent
Wilson et al.

(10) Patent No.: US 9,959,900 B1
(45) Date of Patent: May 1, 2018

(54) COMPENSATING TRACKING ERROR SIGNAL OFFSET IN OPTICAL TAPE STORAGE SYSTEMS

(71) Applicant: Oracle International Corporation, Redwood Shores, CA (US)

(72) Inventors: Scott David Wilson, Thornton, CO (US); Hua Zhong, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days. days.

(21) Appl. No.: 15/665,311

(22) Filed: Jul. 31, 2017

(51) Int. Cl.
*G11B 7/00* (2006.01)
*G11B 20/10* (2006.01)
*G11B 7/003* (2006.01)

(52) U.S. Cl.
CPC ........ *G11B 20/10388* (2013.01); *G11B 7/003* (2013.01)

(58) Field of Classification Search
CPC ............ G11B 20/10527; G11B 27/105; G11B 7/0901; G11B 7/0938; G11B 7/0945; G11B 7/05811; G11B 7/08541; G11B 7/094; G11B 5/6005; G11B 5/59633; G11B 5/59627; G11B 5/012

USPC ......... 369/30.23, 44.26, 44.27, 44.28, 44.32, 369/47.39; 360/75, 77.01, 77.06
See application file for complete search history.

(56) References Cited

U.S. PATENT DOCUMENTS 6,081,401 A * 6/2000 Varian .................... G11B 5/584
360/119.01

* cited by examiner

*Primary Examiner* — Nabil Hindi
(74) *Attorney, Agent, or Firm* — Invoke

(57) ABSTRACT

Operations include compensating for a Tracking Error Signal (TES) offset in an optical tape drive. The tracking error offset compensation system detects a control signal for controlling movement of an optical head across a surface of a tape. The tracking error offset compensation system computes an estimated movement of the optical head, based on the initial control signal. The tracking error offset compensation system determines an estimated TES offset, based on the estimated movement of the optical head. The tracking error offset compensation system uses the estimated TES offset to correct a TES. The tracking error offset compensation system transmits the corrected TES, for controlling additional movement of the optical head.

20 Claims, 13 Drawing Sheets

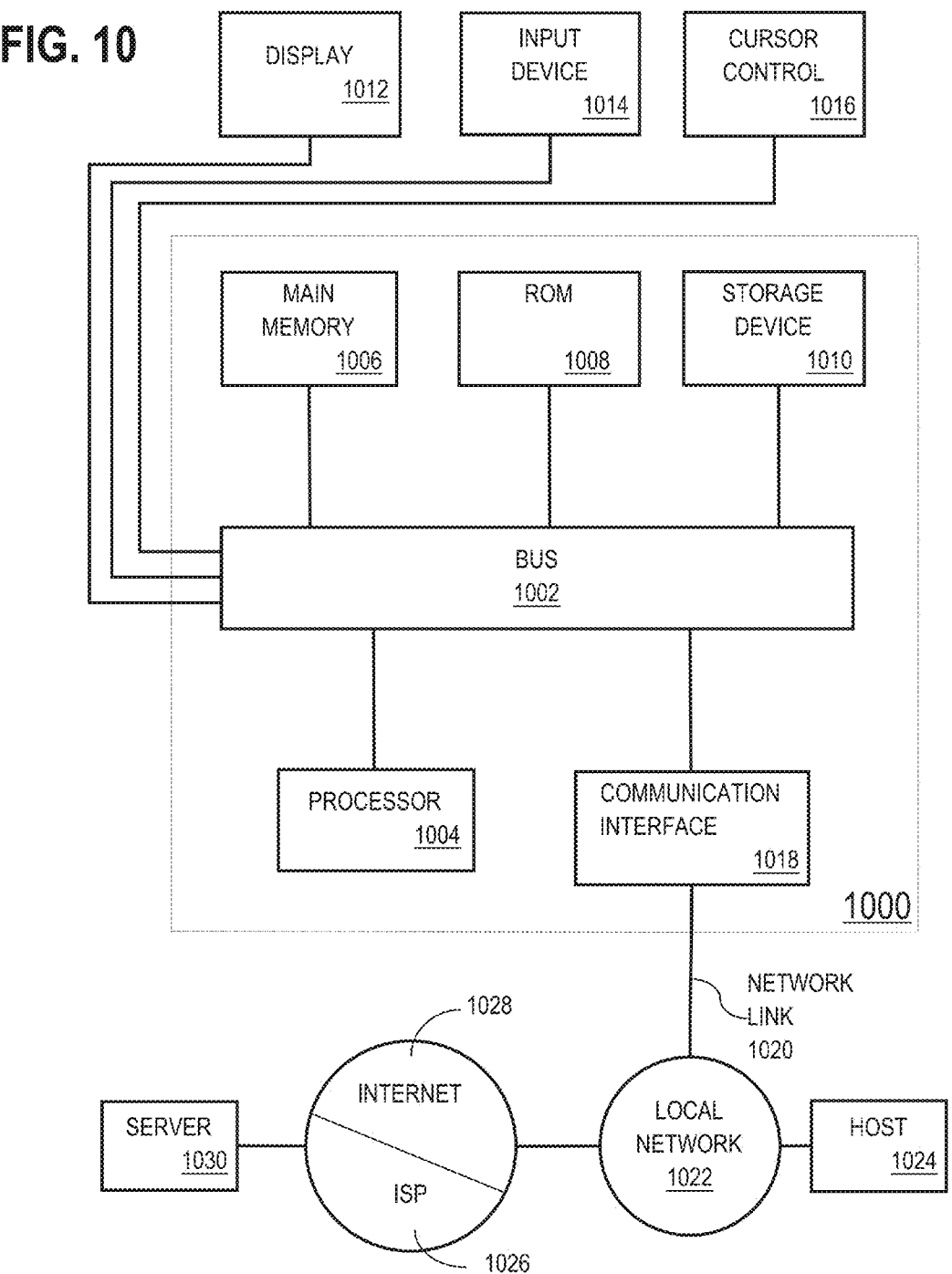

US 9,959,900 B1

COMPENSATING TRACKING ERROR SIGNAL OFFSET IN OPTICAL TAPE STORAGE SYSTEMS

TECHNICAL FIELD

The present disclosure relates to compensating a tracking error signal (TES) offset in optical tape storage systems.

BACKGROUND

Optical data storage systems read and/or write to optical media using a light beam. Traditional optical data storage systems read and/or write to a disk, such as a compact disk (CD). Increasingly, optical data storage systems use optical tape as a storage medium. Optical tape is a long, thin strip of material such as plastic. Optical tape is durable and has large storage capacity compared to optical disks or magnetic tape.

A tape drive may use an optical pickup unit (OPU) comprising an optical head to read and/or write to a tape. A tape may include thousands of parallel tracks that run longitudinally along the length of the tape. To read from a particular track of the tape, an OPU is configured at a lateral position, with respect to the tape, that corresponds to the particular track. A shift in the lateral direction, with respect to the tape, is referred to herein as a movement of the OPU in a tracking direction. Optical heads typically experience shifts in the tracking direction, which can cause tracking errors and subsequent data errors. To compensate for the shift, a system may generate a tracking error signal (TES). The TES is indicative of a lateral position of the OPU with respect to the tape. Based on the TES, the system moves the optical head in a lateral direction to a desired lateral position with respect to the tape. A tracking error signal is commonly normalized, and is referred to as a normalized tracking error signal (NTES). When a tape drive is in operation, the optical head moves to follow or seek tracks. As the optical head moves, the lateral displacement of the optical head relative to other optical components may cause an electrical offset (e.g., an error) in the TES.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 illustrates a block diagram of a system in accordance with one or more embodiments.

DETAILED DESCRIPTION

Figure 1A:
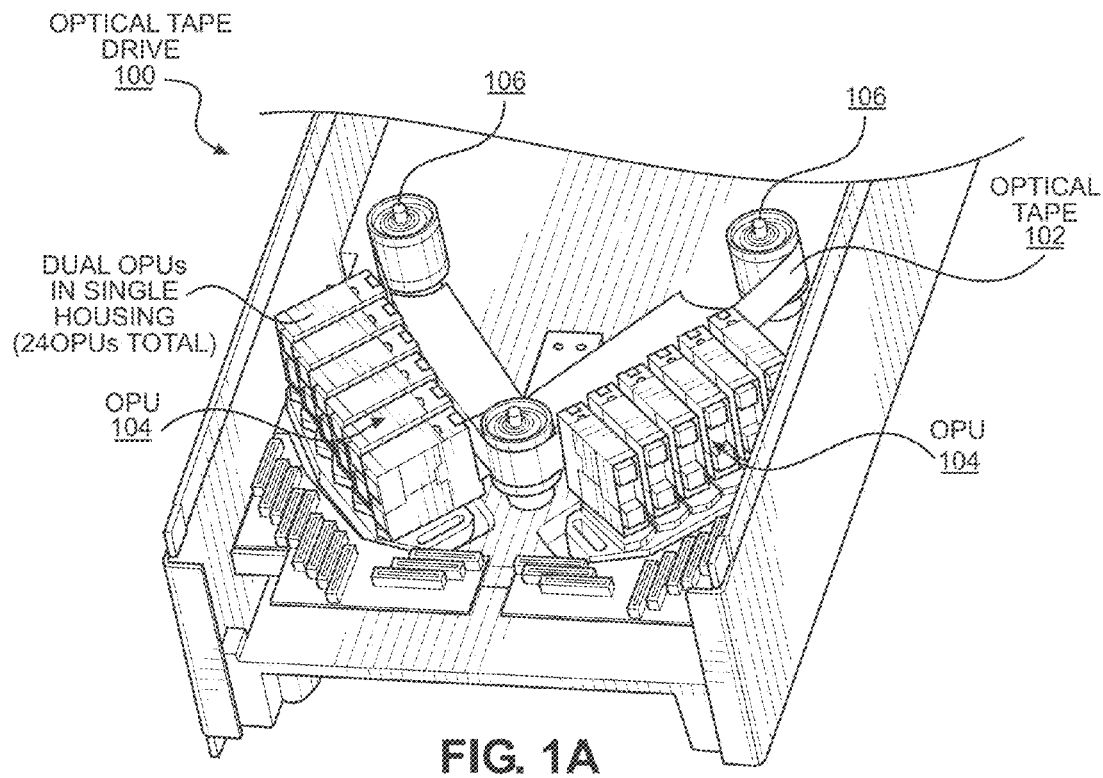
FIG. 1A illustrates an optical tape drive system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. OPTICAL TAPE DRIVE SYSTEM
3. TRACKING ERROR SIGNAL OFFSET IN OPTICAL TAPE SYSTEMS
4. TRACKING ERROR SIGNAL OFFSET COMPENSATION SYSTEM
5. CONTROLLING AN OPTICAL HEAD WITH A MODIFIED TRACKING ERROR SIGNAL
   A. GENERATING A TRACKING ERROR SIGNAL

B. GENERATING A MODIFIED TRACKING ERROR SIGNAL
6. MAPPING OPTICAL HEAD MOVEMENTS TO TRACKING ERROR SIGNAL OFFSET VALUES
7. ESTIMATING THE MOVEMENT OF THE OPTICAL HEAD
   A. ESTIMATING OPTICAL HEAD MOVEMENT AS A FUNCTION OF FREQUENCY RESPONSE
   B. ESTIMATING OPTICAL HEAD MOVEMENT AS A FUNCTION OF ACTUATOR DYNAMICS PARAMETERS
8. MISCELLANEOUS; EXTENSIONS
9. HARDWARE OVERVIEW

1. General Overview

One or more embodiments include controlling a lateral movement of an optical head based on (a) a Tracking Error Signal (TES) and (b) an error in the TES referred to as a TES offset. An optical tape drive system may generate a TES representing a lateral position of an optical head with respect to a tape. The TES may be generated subsequent to a lateral movement of an optical head with respect to a tape. The TES may also be generated subsequent to a minor lateral movement of the tape with respect to the optical head. The minor lateral movement of the tape with respect to the optical head may be the result of a tape sliding laterally on a tape support while the tape is forwarded longitudinally past an optical head. The TES generated by the optical tape drive may include an electronic offset error, also referred to herein as a TES offset. In order to realign an optical head on a target track, the system computes a subsequent lateral movement of the optical head based on both the TES and the TES offset.

In one or more embodiments, the tracking error offset compensation system detects an initial control signal being used for controlling a movement of an optical head across a surface of a tape. The tracking error offset compensation system computes an estimated movement of the optical head, based on the initial control signal. The tracking error offset compensation system estimates a TES offset for each TES generated for the optical head. The TES offset is based on the estimated movement of the optical head. The TES is generated based on a measured movement or measured location of the optical head. The tracking error offset compensation system may use the estimated TES offset to correct the TES. The tracking error offset compensation system transmits the corrected TES, used for controlling additional movement of the optical head.

The tracking error offset compensation system may obtain the estimated TES offset from a mapping of estimated optical head shift distances to estimated TES offsets. The tracking error offset compensation system may calculate the estimated optical head shift distance from a measured drive current and an actuator model. The actuator model may, for example, be a function of frequency measurement data, or a function of key physical parameters of the actuator.

One or more embodiments described in this Specification and/or recited in the claims may not be included in this General Overview section.

2. Optical Tape Drive System

Figure 1B:
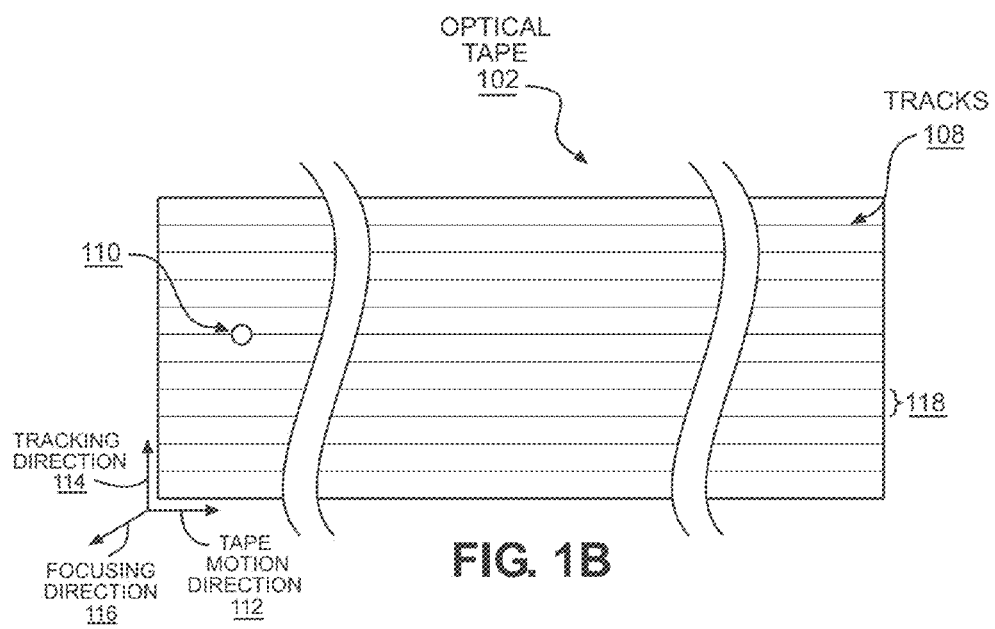
FIG. 1B illustrates an optical tape in accordance with one or more embodiments.

FIGS. 1A and 1B illustrate an optical tape drive system 100 in accordance with one or more embodiments. The optical tape drive system 100 may include more components or fewer components than the components illustrated in FIGS. 1A and 1B. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

As shown in FIG. 1A, the optical tape drive 100 includes a plurality of optical pickup units (OPUs) 104 for reading and/or writing to an optical tape 102. An OPU includes one or more actuators, an optical head, and other optical components. The actuators may be voice coil motors. Responsive to current driven to an actuator, the optical head moves linearly. As indicated in FIG. 1A, the system pictured includes 24 OPUs comprising 12 dual OPUs. Each of the dual OPUs is disposed in a single housing. The optical tape drive may include any number of OPUs. The OPUs may be dual OPUs or single OPUs.

The optical head includes components for reading and/or writing to optical tape. The optical head may include one or more lasers for generating a laser beam and a lens for focusing a laser beam. The optical head is moved, by an actuator, to align with a particular portion of the tape. When the optical head moves, the lens moves, and the position of the laser on the tape moves. Optical head movement may be described herein interchangeably with lens movement. The lens is attached to the OPU with spring-like flexures. The optical head includes a tracking servo and a focus servo to control motion of the lens, as described below.

FIG. 1B illustrates an optical tape 102 in accordance with one or more embodiments. The optical tape 102 may be a recording medium approximately ½ inch wide and 1,000 or more meters long. There may be many tens of thousands of data tracks 108 disposed along the optical tape 102. The data tracks 108 are disposed parallel with the edge of the tape, across the half-inch width of the tape. For simplicity, the optical tape pictured includes ten data tracks 108. The tracks are separated by a track pitch 118 (also referred to as a track width). A typical track pitch in optical tape is about 320 nanometers (nm).

The optical tape 102 moves between the reels 106 in the longitudinal tape motion direction 112. As the optical tape 102 moves from reel to reel, a track on the tape moves with respect to the optical head position 110.

In general, the motion of the optical head is driven by a tracking system and a focusing system (not shown). The tracking system may include a tracking servo and a tracking actuator. The tracking system controls motion of the optical head in a lateral tracking direction 114. The optical head moves laterally to follow or seek a track on the tape.

The focusing system controls motion of the optical head in the focusing direction 116, perpendicular to the tape surface. The focusing system may include a focusing servo and a focusing actuator. In general, aspects disclosed herein may focus on a motion in the tracking direction and assume that the motion in a focusing direction is perfectly controlled. References to an actuator hereinafter refer to the tracking actuator unless specified otherwise.

3. Tracking Error Signal Offset in Optical Tape Systems

Figure 2A:
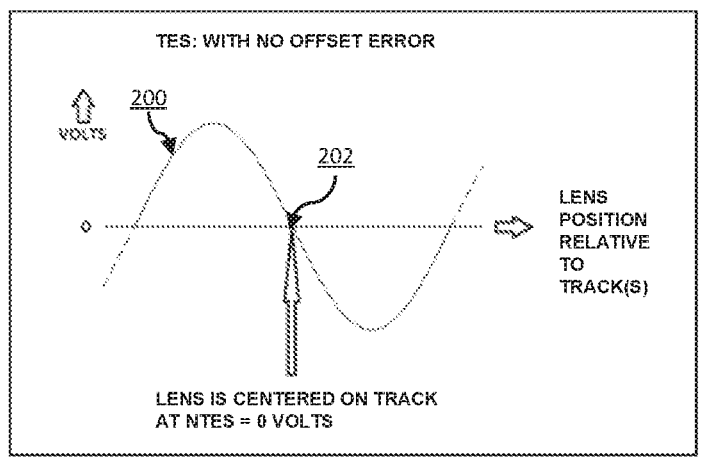
FIG. 2A illustrates a TES with no offset error in accordance with one or more embodiments.

FIG. 2A illustrates a TES 200 with no offset error in an optical tape system. In FIG. 2A, the lens is aligned with the center of the track, with a shift in the lateral direction substantially equal to zero ("the neutral position"). When the lens is in the neutral position, the lens is properly aligned with other optical components in the OPU. In particular, the lens is properly aligned with the component that generates the TES (e.g., photodiode integrated circuit 322). When the lens is in the neutral position, the TES is equal to zero Volts, as depicted in FIG. 2A (202).

Figure 2B:
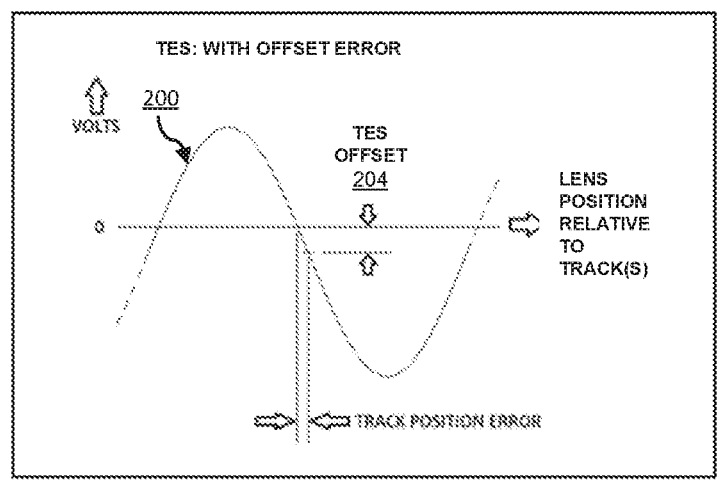
FIG. 2B illustrates a TES with an offset error in accordance with one or more embodiments.

FIG. 2B illustrates a TES 200 with a TES offset 204. As the tape moves longitudinally, vibrations throughout the optical tape drive can cause the tape to move with respect to the optical head. Given the small track pitch in optical tape, a movement as small as 10 nm can significantly affect the tracking accuracy. As the optical head shifts away from its neutral position, the TES 200 is prone to errors.

When the lens is far enough away from the neutral position, the overall mean of the TES 200 is no longer zero due to a change in the relative position of the lens and other optical components in the OPU. As the lens shifts from the neutral position, the TES offset 204 increases. With a non-zero TES offset 204, the TES 200 is non-zero when the lens is located at the center of a desired track. With a non-zero TES offset, the TES 200 is not an accurate representation of the tracking error. An uncompensated TES offset 204 may cause track centering errors and ultimately introduce data errors during read and write operations. TES offset is generally unavoidable as long as the lens moves to follow tracks on the optical tape while other optical components remain fixed.

Figure 2C:
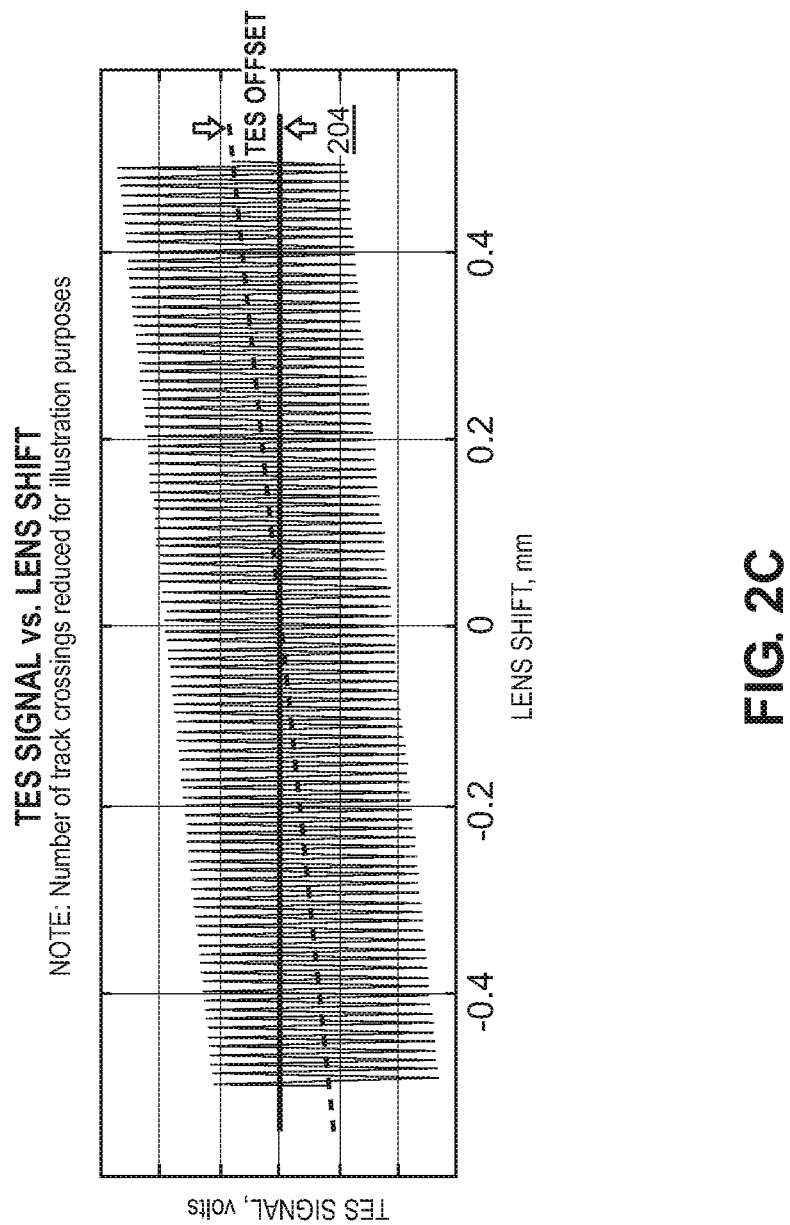
FIG. 2C illustrates NTES signal as a function of lens shift in accordance with one or more embodiments.

FIG. 2C illustrates the relationship between TES and lens shift, in accordance with one or more embodiments. FIG. 2C shows TES in Volts vs. lens shift in millimeters. The oscillations in the graph represent track crossings, which are reduced for illustrative purposes. As shown in FIG. 2C, the TES offset 204 is closely dependent on the distance of the lens shift. Usually, the further the lens shifts away from its neutral position, the larger the TES offset 204 is for the TES 200. The TES offset 204 may be as high as ±40% of the TES peak-to-peak for a lens shift of ±0.50 mm.

4. Tracking Error Signal Offset Compensation System

Figure 3A:
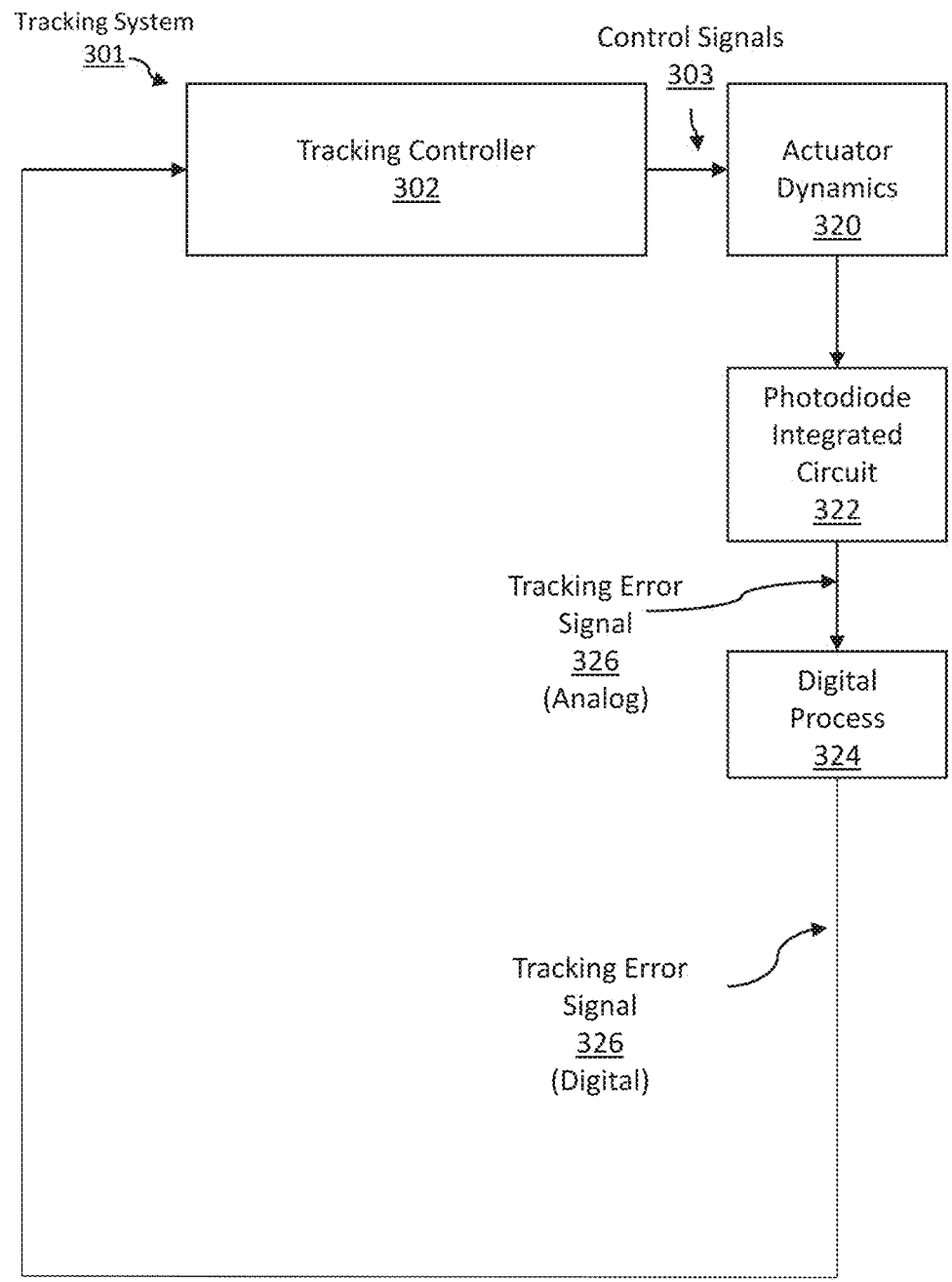
FIG. 3A illustrates a tracking system without a tracking error offset compensation system in accordance with one or more embodiments.

FIG. 3A illustrates a tracking system 301 without a tracking error offset compensation system. The tracking system 301 is a system with an optical head designed to follow a track on an optical tape.

As illustrated in FIG. 3A, the tracking system 301 includes a tracking controller 302, actuator dynamics 320, a photodiode integrated circuit (PDIC) 322, and digital process 324. In one or more embodiments, the tracking system 301 may include more components or fewer components than the components illustrated in FIG. 3A. The components illustrated in FIG. 3A may be local to or remote from each other. The components illustrated in FIG. 3A may be implemented in software and/or hardware. Each component may be distributed over multiple applications and/or machines. Multiple components may be combined into one application and/or machine. Operations described with respect to one component may instead be performed by another component.

In an embodiment, the tracking controller 302 is a controller for tracking motion of an optical head. The tracking controller 302 may accept, as input, a tracking error signal. The tracking controller 302 may accept additional data specifying a desired spot on a track on which to focus the lens. Based on input to the tracking controller 302, the tracking controller 302 outputs control signals 303.

In an embodiment, a control signal 303 is a current to be applied to the actuator dynamics 320 to generate a motion. The magnitude of the current is based on the desired motion of the optical head.

In an embodiment, the actuator dynamics 320 includes a tracking actuator (not shown). The tracking actuator may be a voice coil motor. The tracking actuator receives a control signal 303. The tracking actuator produces a linear motion to drive the optical head across a tape in a tracking, or lateral, direction. The actuator dynamics 320 moves the optical head to a desired optical head position 110.

In an embodiment, the photodiode integrated circuit (PDIC) 322 is an optical sensor that generates a signal. A photodiode converts light into an electrical current. The photodiode integrated circuit generates a tracking error signal (TES) 326, based on the detected position of the laser beam.

In an embodiment, the tracking error signal 326 is a signal indicative of how far the optical head is from the desired track spotting position. The TES may be a signal measured in Volts (V). For example, the TES may be set to 0 V when the laser is spotted directly on the desired track. The TES may represent the lateral position of the laser spot with respect to a tape, which corresponds to the lateral position of the optical head with respect to the tape. Across known methods of generating a TES, electrical offset errors are generally unavoidable. The tracking error signal produced by the PDIC 322 generally corresponds to an analog TES with an offset corresponding to an error.

In an embodiment, the digital process 324 is an analog-to-digital converter (ADC). The digital process 324 includes hardware and/or software configured to convert the analog TES signal into a digital TES signal. The output of the digital process 324 may be a digital version of the TES, with offset.

Figure 3B:
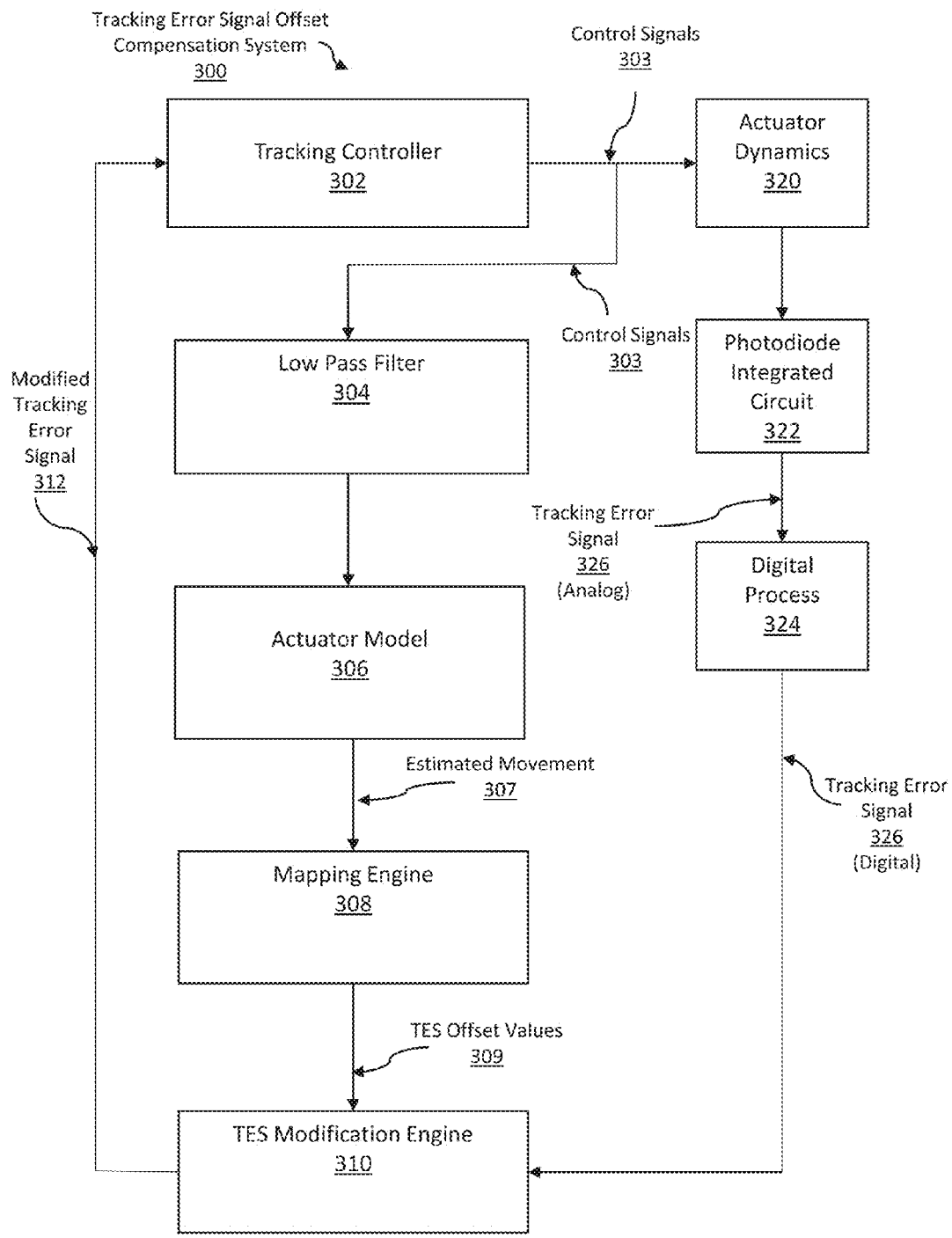
FIG. 3B illustrates a tracking system with a tracking error offset compensation system in accordance with one or more embodiments.

FIG. 3B illustrates a tracking error offset compensation system 300 in accordance with one or more embodiments. The tracking error signal offset compensation system 300 is a system designed to compensate a TES based on an estimated TES offset. As illustrated in FIG. 3B, the tracking error offset compensation system 300 includes a tracking controller 302, actuator dynamics 320, a photodiode integrated circuit (PDIC) 322, and digital process 324, as described with respect to FIG. 3A. The tracking error offset compensation system 300 further includes a low pass filter 304, actuator model 306, mapping engine 308, and TES modification engine 310. In one or more embodiments, the tracking error offset compensation system 300 may include more components or fewer components than the components illustrated in FIG. 3B. The components illustrated in FIG. 3B may be local to or remote from each other. The components illustrated in FIG. 3B may be implemented in software and/or hardware. Each component may be distributed over multiple applications and/or machines. Multiple components may be combined into one application and/or machine. Operations described with respect to one component may instead be performed by another component.

In an embodiment, the low pass filter 304 is a filter that passes signals with frequencies below a cutoff frequency. Frequencies higher than the cutoff frequency are attenuated by the low pass filter 304. The low pass filter may remove high frequency components from the drive control signals 303. High frequency components in the control signals 303 are for fine positioning of the lens close to a desired track. The control signals, after being filtered by the low pass filter 304, are limited to low frequency components. Low frequency components in the control signals 303 determine the macro position of the lens. The low pass filter includes functionality to transmit the filtered control signals to the actuator model 306.

In an embodiment, the actuator model 306 is a model for the motion of the actuator in response to a control signal. The actuator model 306 includes functionality to determine the shift of the optical head. Ideally, the actuator model 306 generates estimated optical head movements which are equal to the actual optical head movements generated by the actuator dynamics 320. The actuator model may be derived as explained in Section 7. The actuator model includes functionality to generate and output a signal indicative of the estimated lens shift (estimated movement 307).

In an embodiment, the estimated movement 307 is an estimated movement of the optical head. The estimated movement 307 is the distance that the optical head is estimated to move away from the neutral position, responsive to a particular control signal 303.

In an embodiment, the mapping engine 308 includes hardware and/or software configured to map estimated movements 307 to TES offset values 309. As shown in FIG. 2C, the TES offset increases with lens shift. The relationship between estimated movements 307 and TES offset values can be determined experimentally by measuring optical head movement and TES offset, responsive to an applied signal, as described in Section 6. The relationship between estimated movement and TES offset values may be used to generate a mapping of estimated movements and TES offset values. The mapping may be stored in the form of a look-up table of one-to-one mappings of estimated movements and associated TES offset values.

In an embodiment, a TES offset value 309 characterizes an offset error in the TES. As described in Section 3, as the lens moves away from the neutral position, the lens is laterally displaced relative to other optical components in the OPU. This lateral displacement causes an electrical offset in the TES. An uncompensated TES offset value may cause track centering errors and ultimately introduce data errors during read and write operations. The magnitude of the TES offset increases as the lens shifts further away from a neutral position. The TES offset value 309 may be positive or negative to indicate the direction of the TES offset. The TES offset value 309 may be measured in Volts.

In an embodiment, the TES modification engine 310 includes hardware and/or software configured to generate a modified TES 312. The TES modification engine may use the uncorrected TES 326 and the TES offset value 309 to generate a modified TES 312.

In an embodiment, the modified tracking error signal 312 is a tracking error signal that has been adjusted to correct for TES offset. The TES modification engine may transmit the modified tracking error signal 312 to the tracking controller 302.

5. Controlling an Optical Head with a Modified Tracking Error Signal

FIG. 3B illustrates an example set of operations for controlling an optical head with a modified tracking error signal, in accordance with one or more embodiments. One or more operations illustrated in FIG. 3B may be modified, rearranged, or omitted altogether. Accordingly, the particular sequence of operations illustrated in FIG. 3B should not be construed as limiting the scope of one or more embodiments.

In an embodiment, the tracking controller 302 generates a control signal 303. The tracking controller 302 may generate a control signal by generating a current proportional to a desired motion of the optical head.

In an embodiment, tracking controller transmits the control signals 303 to the tracking error offset compensation path (components 304-310). The tracking controller may simultaneously transmit the control signals 303 to the tracking error signal generation path (components 320-324). The system, via the tracking error signal generation path, generates a TES 326 (which may include an offset). The system also generates, via the tracking error offset compensation path, TES offset values 309. The TES offset values are used to revise the TES, to provide a more accurate TES 326.

A. Generating a Tracking Error Signal

In an embodiment, the system generates a tracking error signal, which may include an offset. The tracking controller 302 transmits the control signals 303 to the actuator dynamics 320. The tracking controller 302 may transmit the control signals 303 to the actuator dynamics by transmitting a current via a physical connection between the tracking controller and the actuator dynamics.

In an embodiment, the actuator dynamics 320 move the optical head, in response to the control signal received. The actuator dynamics 320 may drive the current into the tracking actuator to accelerate the optical head, causing the optical head to move across the surface of the tape. The actuator dynamics 320 may move the optical head laterally relative to one or more tracks on the tape. As the actuator dynamics 320 moves the optical head to focus on a position on the tape, the laser is guided to a respective position on the tape.

In an embodiment, the system determines a tracking error signal. There are several methods for generating a TES known in the art. The system may determine a tracking error signal by any method known in the art. The system may detect, via PDIC 322, one or more optical signals corresponding to the position of the laser beam on the tape. The position of the laser beam on the tape corresponds to the position of the optical head with respect to the width of a data track, subsequent to the application of the initial control signal. The PDIC 322 may use a photodiode to convert the received optical signals, corresponding to the position of the laser beam on the tape, to an analog TES. Because the position of the laser beam on the tape corresponds to the position of the optical head with respect to the width of a data track, the TES is based on the position of the optical head with respect to the width of a data track.

The TES produced by the PDIC may include an offset. The TES, with offset, may not accurately represent the actual tracking error in the system.

In an embodiment, the digital process 324 converts the analog TES received from the PDIC 322 to a digital TES. The output of the digital process 324 is a digital version of the tracking error signal produced by the PDIC.

B. Generating a Modified Tracking Error Signal

In an embodiment, the system detects an initial control signal for controlling movement of the optical head across the surface of the tape. The system identifies control signals generated by the tracking controller for controlling the actuator dynamics.

In an embodiment, a low pass filter 304 is applied to the control signals. The low pass filter 304 removes high frequency components from the control signal 303. The low pass filter 304 may remove high frequency components from the control signal 303 by attenuating frequencies above a cutoff value. The low pass filter transmits the filtered current to the actuator model 306.

In an embodiment, the system computes an estimated a movement of the optical head 307, based on the applied control signal 303. The system may use the actuator model 306 to estimate the movement of the lens 307. The actuator model 306 receives the control signals 303 subsequent to application of a low pass filter. The actuator model 306 computes an estimated movement 307 based on control signals 303. As an example, the system models the behavior of the actuator dynamics 320 in a simulation or formula which estimates the estimated movement 307 of the optical head 307.

In an embodiment, based on the estimated movement of the optical head, the system determines a tracking error signal offset value 309. The mapping engine 308 may query a look-up table to retrieve a TES offset value 309 corresponding to a particular estimated movement 307. For example, using a mapping of TES offset values to estimated movements, the system determines that, for an estimated optical head movement of 0.1 mm, the TES offset value for a particular OPU is 0.02 V. The mapping engine 308 may transmit the TES offset value 309 to the TES modification engine 310.

In an embodiment, the TES modification engine 310 applies the tracking error signal offset to the tracking error signal. The TES modification engine 310 may increment or decrement the tracking error signal 326, as generated by the PDIC, based on the tracking error signal offset value 309. Based upon the TES 326 and TES offset value 309, the TES modification engine generates a modified tracking error signal 312.

In an embodiment, the TES modification engine transmits the modified TES 312 to the tracking controller 302. The tracking controller uses the modified TES to generate a new control signal to transmit to the actuator dynamics. The new control signal is transmitted in an attempt to laterally move the optical head to the approximate lateral center of a target track. As an example, an optical tape drive system generates an initial control signal to control an optical head to read from a particular data track on an optical tape.

The system generates a tracking error signal value (with offset). The tracking controller transmits the initial control signal to the actuator dynamics. The actuator dynamics move the optical head, responsive to the control signal. The PDIC detects an optical signal corresponding to the optical head position. The PDIC generates a tracking error signal of 0.2 V. The 0.2 V tracking error signal includes a 0.05 V offset. The digital process converts the analog TES to a digital form.

The system also uses the initial control signal to generate a TES offset value. First, the system transmits the initial control signal through a low pass filter, to remove high frequency components. Next, the system transmits the filtered initial control signal to the actuator model. The system uses the actuator model to compute an estimated movement of the optical head. By inputting the filtered initial control signal into the actuator model, the system determines that the optical head will shift by 0.25 mm.

Next, based on the estimated movement of the optical head, the system determines a tracking error signal offset. The mapping engine queries a look-up table for the tracking error signal offset value corresponding to a 0.25 mm optical head movement. According to the look-up table, for a 0.25 mm optical head movement, there is a 0.05 V tracking error signal offset.

Next, the system applies the tracking error signal offset to the tracking error signal, to obtain a modified tracking error signal. The tracking error signal generated by the PDIC is too high by 0.05 V. The system decrements the tracking error signal generated by the PDIC by 0.05 V, correcting the offset in the tracking error signal. The corrected tracking error signal is equal to 0.2 V–0.05 V=0.15 V. The modified tracking error signal represents the actual tracking error in the system.

Finally, the system transmits the modified tracking error signal to the tracking controller, as a new control signal, to control additional movement of the optical head. The optical head now moves to the desired spot on the track accurately, as the modified tracking error signal correctly compensates for errors in the movement of the optical head with respect to the tape.

6. Mapping Optical Head Movements to Tracking Error Signal Offset Values

Figure 4:
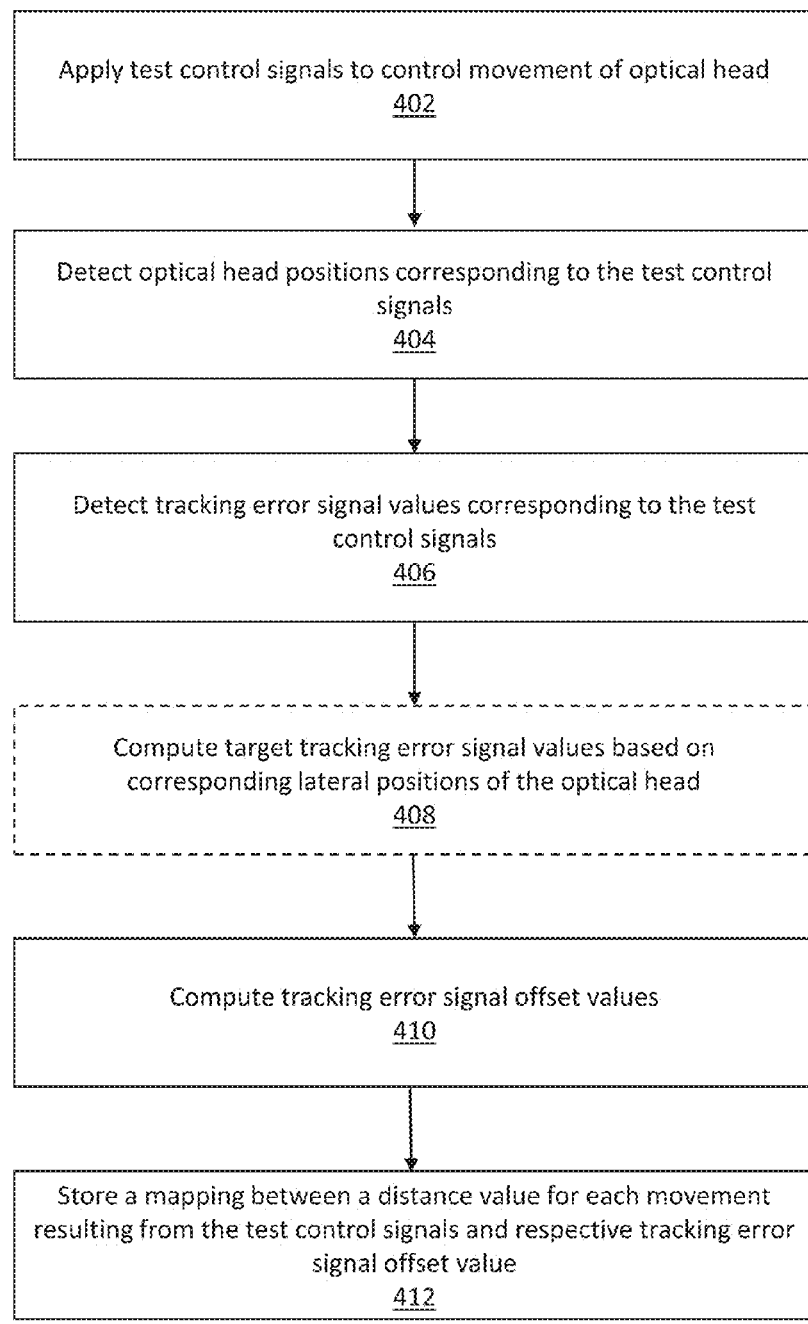
FIG. 4 illustrates an example set of operations for generating a mapping between optical head movements and tracking error signal offset values in accordance with one or more embodiments.

FIG. 4 illustrates an example set of operations for mapping optical head movements to tracking error signal offset values, in accordance with one or more embodiments. One or more operations illustrated in FIG. 4 may be modified, rearranged, or omitted altogether. Accordingly, the particular sequence of operations illustrated in FIG. 4 should not be construed as limiting the scope of one or more embodiments.

The relationship between optical head movement and TES offset is measurable for each OPU. The system may establish and store a mapping for each OPU at some initial time. Alternatively, if two or more OPUs in the system have substantially the same relationship between optical head movement and TES offset, the system may store a single mapping for the two or more OPUs. Alternatively or additionally, the system may continuously monitor and update the mapping(s) to account for any changes in the actuator dynamics.

Figure 5A:
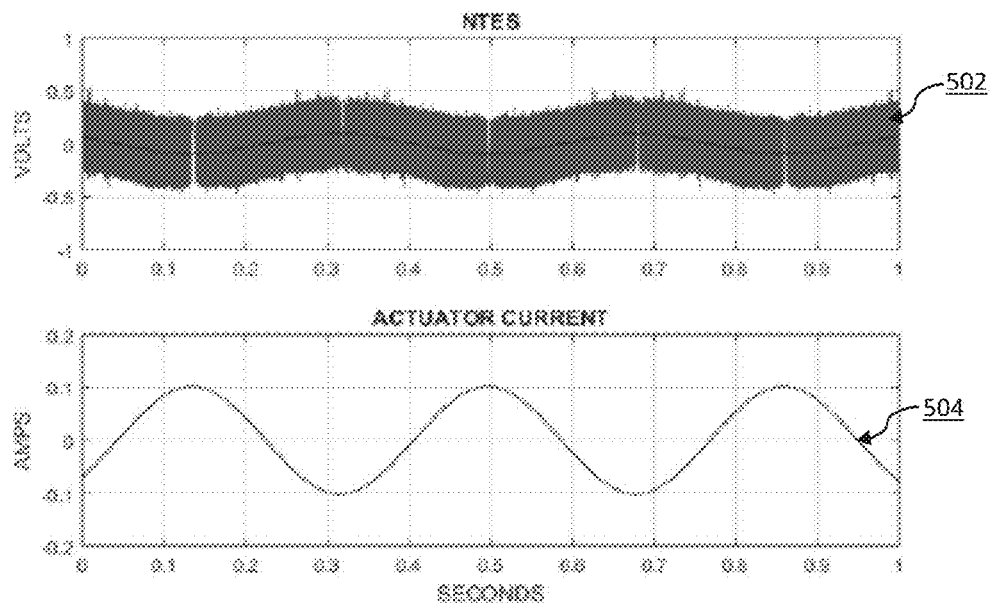
FIG. 5A illustrates a sinusoidal actuator current and associated NTES in accordance with one or more embodiments.

In an embodiment, the system applies test control signals to control movement of the optical head (Operation 402). The tracking controller may transmit a sinusoidal signal, over a range of frequencies, to the actuator dynamics. FIG. 5A illustrates a low frequency sinusoidal current waveform 504 that may be applied as a test control signal. The test control signal may be applied while the lens is focused, or locked, on a target on the optical tape. The test control signal may be applied in the optical tape drive with the tape motion stopped.

In an embodiment, the system detects optical head positions corresponding to the test control signals (Operation 404). The applied sinusoidal signal slowly moves the actuator up and down. The system detects the position of the optical head over time. The distance of optical head shift may be calculated by multiplying the track pitch of the tape by the number of tracks that the lens has skated across during the measurement time.

In an embodiment, the system detects tracking error signal values corresponding to the test control signals (Operation 406). The PDIC may generate a TES value (with offset), responsive, at least in part, to the test control signals. FIG. 5A illustrates the TES waveform 502 generated based on the sinusoidal test control signals 504.

In an embodiment, the system computes target tracking error signal values based on corresponding lateral positions of the optical head (Operation 408). The system may use the detected optical head positions to compute a target TES value which accurately represents the position of the optical head.

In an embodiment, the system computes tracking error signal offset values (Operation 408). The tracking error signal offset values may be based on a difference between each detected tracking error signal value and an associated target tracking error signal value. The system may compute a difference between the tracking error signal values and the target tracking error signal values, to determine the TES offset.

Figure 5B:
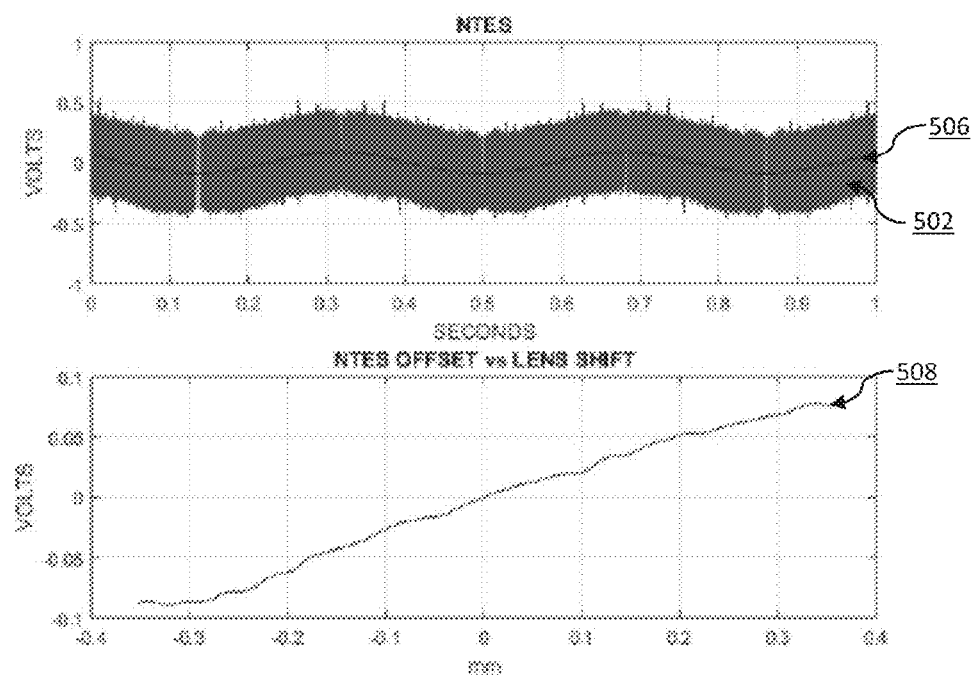
FIG. 5B illustrates NTES offset vs. lens shift in accordance with one or more embodiments.

Alternatively or additionally, the system may compute the TES offset values using the TES waveform 502 shown in FIGS. 5A and 5B. The TES offset 506 is the midpoint between the peaks and valleys of the TES waveform 502. The system may compute a median value of the TES waveform 502 which corresponds to the TES offset value 502. FIG. 5B shows a typical relationship between NTES offset and lens shift 508.

In an embodiment, the mapping engine stores a mapping between distance values for movements resulting from the test control signals and respective tracking error signal offset values (Operation 410). The system may store a plurality of TES offset values and associated optical head shift values. The system may, for example, store a mapping between TES offset values and optical head shift values to a look-up table.

7. Estimating the Movement of the Optical Head

The system uses the actuator model 306 to estimate the movement of the optical head, based on an applied control signal. The actuator model 306 may be any mathematical model that accurately represents the actuator response. For example, the actuator model can be generated using (a) a function of frequency response of the actuator and/or (b) a function of actuator dynamics parameters.

A. Estimating Optical Head Movement as a Function of Frequency Response

Figure 6:
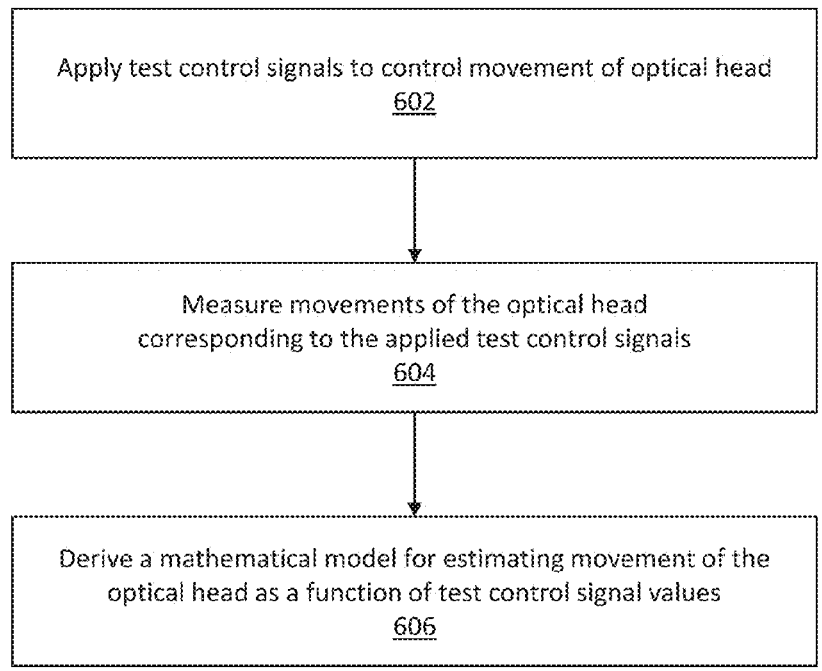
FIG. 6 illustrates an example set of operations for deriving a mathematical model for estimating the movement the lens as a function of control signal values in accordance with one or more embodiments.

FIG. 6 illustrates an example set of operations for estimating optical head movement as a function of frequency response, in accordance with one or more embodiments. One or more operations illustrated in FIG. 6 may be modified, rearranged, or omitted altogether. Accordingly, the particular sequence of operations illustrated in FIG. 6 should not be construed as limiting the scope of one or more embodiments.

In an embodiment, the system applies test control signals to control the movement of the optical head (Operation 602). The system may stimulate the actuator with a sinusoidal signal over a range of frequencies. For example, the system may apply test control signals over a frequency range from 10 Hz to 50 kHz.

Figure 7A:
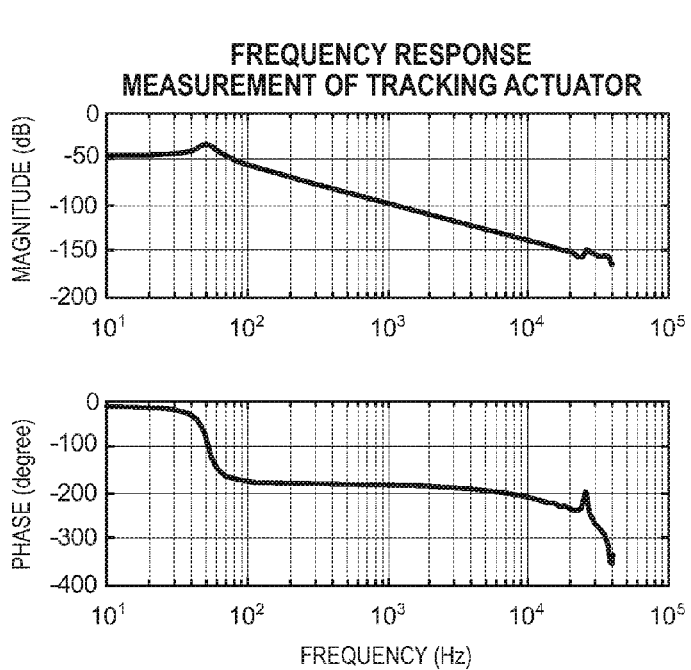
FIG. 7A illustrates measured frequency response of a tracking actuator in accordance with one or more embodiments.

In an embodiment, the system measures movements of the optical head corresponding to the applied test control signals (Operation 604). The system may detect the motion of the optical head and/or the components of the optical head over time, as the actuator moves in response to the test control signals. FIG. 7A shows a magnitude and phase plot (known in the art as a Bode plot) of the frequency response measurement of the tracking actuator in response to signals from 10 Hz to 50 kHz. The x-axis is scaled logarithmically.

In an embodiment, the system derives a mathematical model for estimating movement of the optical head as a function of signal values (Operation 606). A least squares regression (LSR) method may be used to derive the mathematical model. The mathematical model is optimized such that the frequency response predicted by the model substantially matches the measured data. The actuator response may be represented by the transfer function:

$$G(z) = \frac{b_0 z^m + b_1 z^{m-1} + \ldots + b_m}{z^n + a_1 z^{n-1} + a_2 z^{n-2} + \ldots + a_n} \quad (1)$$

The transfer function (1) describes the system response, as output/input in the frequency domain (z). In Equation (1), a and b are coefficients to be determined in fitting the model to the measured data. n and m represent the order of the system. The relative degree of the system is r=n−m. The relative degree of the system can be obtained from a Bode plot, as shown in FIG. 7A. At higher frequencies, the slope of the magnitude plot in FIG. 7A is −40 dB/decade, which indicates that the relative degree of the system is 2.

At one particular frequency $\omega_i$, let $p_0 = e^{j\omega_i}$ and the transfer function can be written as:

$$G(p_i) = \frac{b_0 p_i^m + b_1 p_i^{m-1} + \ldots + b_m}{p_i^n + a_1 p_i^{n-1} + a_2 p_1^{n-2} + \ldots + a_n} \quad (2)$$

Rearranging the equation, $$G(p_i)p_i^n = \quad (3)$$

$$[-G(p_i)p_i^{n-1} \ -G(p_i)p_i^{n-2} \ \ldots \ -G(p_i) \ p_i^m \ p_i^{m-1} \ \ldots \ 1]\begin{bmatrix}a_1\\a_2\\\vdots\\a_n\\b_0\\b_1\\\vdots\\b_m\end{bmatrix}$$

For N different frequency points, a series of equations can be formed:

$$\begin{bmatrix}-G(p_0)p_0^{n-1} & -G(p_0)p_0^{n-2} & \ldots & -G(p_0) & p_0^m & p_0^{m-1} & \ldots & 1\\-G(p_1)p_1^{n-1} & -G(p_1)p_1^{n-2} & \ldots & -G(p_1) & p_1^m & p_1^{m-1} & \ldots & 1\\-G(p_2)p_2^{n-1} & & & & & & & 1\\\vdots & & & & & & & \vdots\\\vdots & & & & & & & \vdots\\-G(p_{N-1})p_{N-1}^{n-1} & -G(p_{N-1})p_{N-1}^{n-2} & \ldots & -G(p_{N-1}) & p_{N-1}^m & p_{N-1}^{m-1} & 1\\-G(p_N)p_N^{n-1} & -G(p_N)p_N^{n-2} & \ldots & -G(p_N) & p_N^m & p_N^{m-1} & \ldots & 1\end{bmatrix}$$

$$\begin{bmatrix}a_1\\a_2\\\vdots\\a_n\\b_0\\b_1\\\vdots\\b_m\end{bmatrix} = \begin{bmatrix}G(p_0)p_0^n\\G(p_1)p_1^n\\G(p_2)p_2^n\\\vdots\\\vdots\\G(p_N)p_N^n\\G(p_N)p_N^n\end{bmatrix}$$

When the system has obtained sufficient data points, such that the least squares method is meaningful, (i.e., N>>(m+n)), the solution of the transfer function coefficient vector can be obtained:

$$[a_1 a_2 \ldots a_n b_0 b_1 \ldots b_m]^T \quad (4)$$

If a more accurate fitting at some particular frequency is desired, then a weighted least squares method can be applied.

Figure 7B:
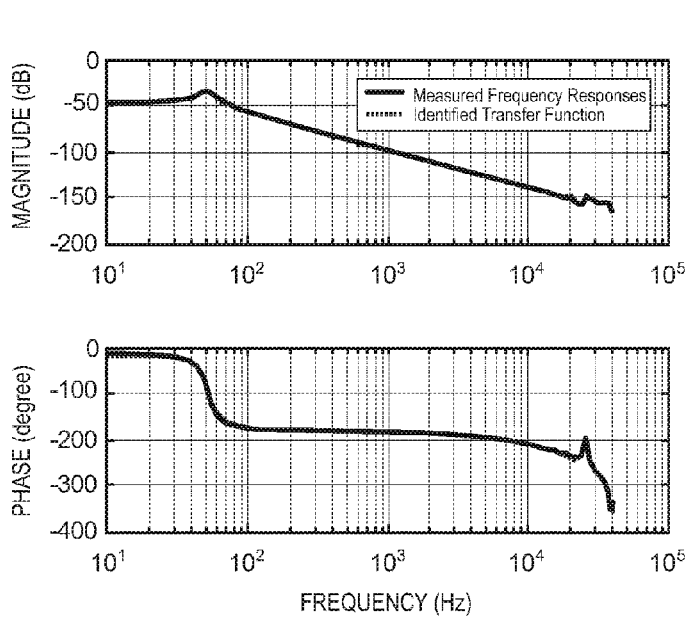
FIG. 7B illustrates frequency response of an identified transfer function, compared with the measured frequency response of a tracking actuator, in accordance with one or more embodiments.

Using the method described above, the system may obtain a $10^{th}$ order transfer function G(z). FIG. 7B shows the measured frequency response (solid line) and the frequency response of the identified transfer function (dotted line). The frequency response of the identified transfer function is effectively not visible, because the transfer function values closely approximate the measured values.

Figure 8:
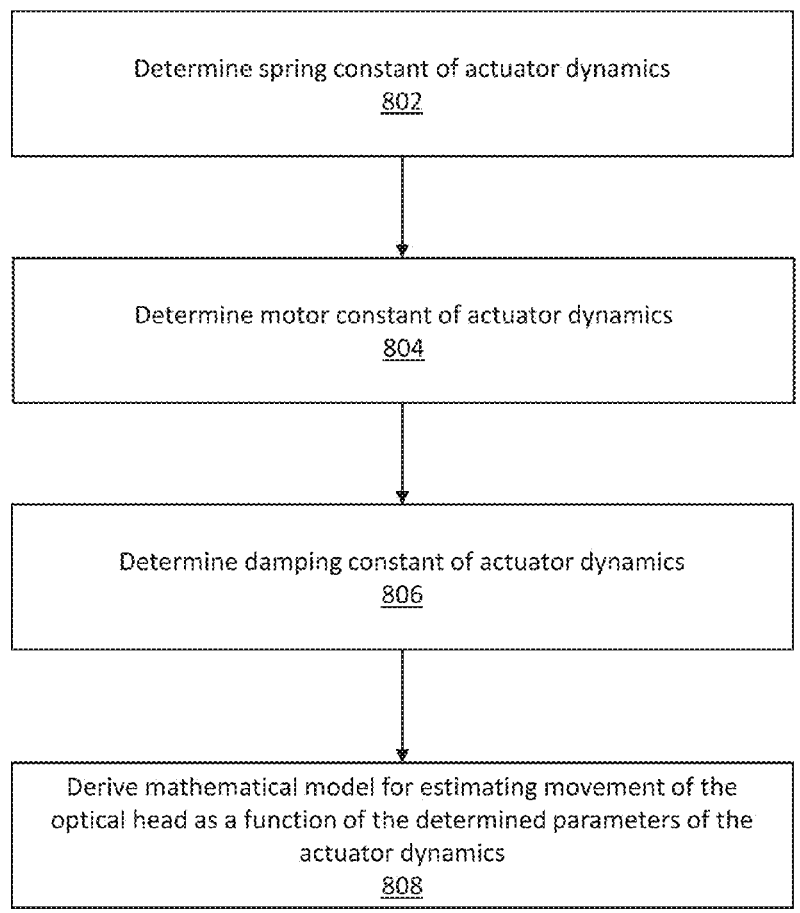
FIG. 8 illustrates an example set of operations for deriving a mathematical model for estimating the movement of the lens as a function of actuator dynamics parameters in accordance with one or more embodiments.

B. Estimating Optical Head Movement as a Function of Actuator Dynamics Parameters FIG. 8 illustrates an example set of operations for estimating optical head movement as a function of actuator dynamics parameters, in accordance with one or more embodiments. One or more operations illustrated in FIG. 8 may be modified, rearranged, or omitted altogether. Accordingly, the particular sequence of operations illustrated in FIG. 8 should not be construed as limiting the scope of one or more embodiments.

In an embodiment, the system approximates optical head movement using a formula, which is a function of actuator dynamics parameters. The system may approximate the movement of the optical head as a function of a spring constant, motor constant, and damping constant of the actuator dynamics. These actuator dynamics parameters may be measured experimentally and inputted into a physical model of the actuator dynamics. The motion equation of a tracking actuator may be described by the equation:

$$\frac{d^2x}{dt^2} + \frac{k_d}{m}\frac{dx}{dt} + \frac{k_s}{m}x - \frac{k_m}{m}I = 0 \qquad (5)$$

where x is the displacement of the actuator from the neutral position, $k_d$ is the damping constant, $k_s$ is the spring constant, $k_m$ is the motor constant, m is the mass of the actuated payload, and I is the drive current. The actuator dynamics parameters may be determined as a function of mass, e.g., k/m, so that the mass need not be known.

Figure 9A:
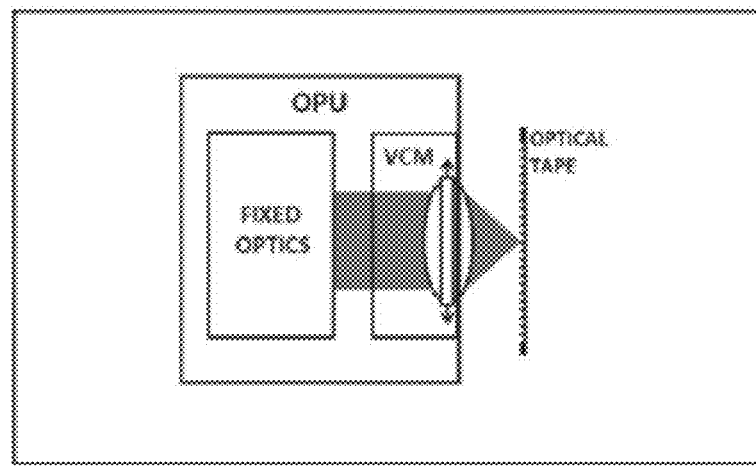
FIG. 9A illustrates the positioning of an optical tape to measure actuator dynamics parameters in accordance with one or more embodiments.

The system may measure the actuator dynamics parameters with the optical tape fixed in front on the OPU, as illustrated in FIG. 9A. When optical tape is fixed in front of an OPU, focus is detected and the focus servo can be locked. The track sensing system is active, but the tracking servo system is not locked.

In an embodiment, the system determines the spring constant of the actuator dynamics (Operation 802). The actuator is represented as a spring/mass system. The resonant frequency of the spring/mass system is $f_0$. The angular resonant frequency of the spring mass system is defined as $\omega_0$ (measured in rad/sec). In a spring/mass system, $$\frac{k_s}{m} = \omega_0 = (2\pi f_0)^2 \qquad (6)$$

Figure 9B:
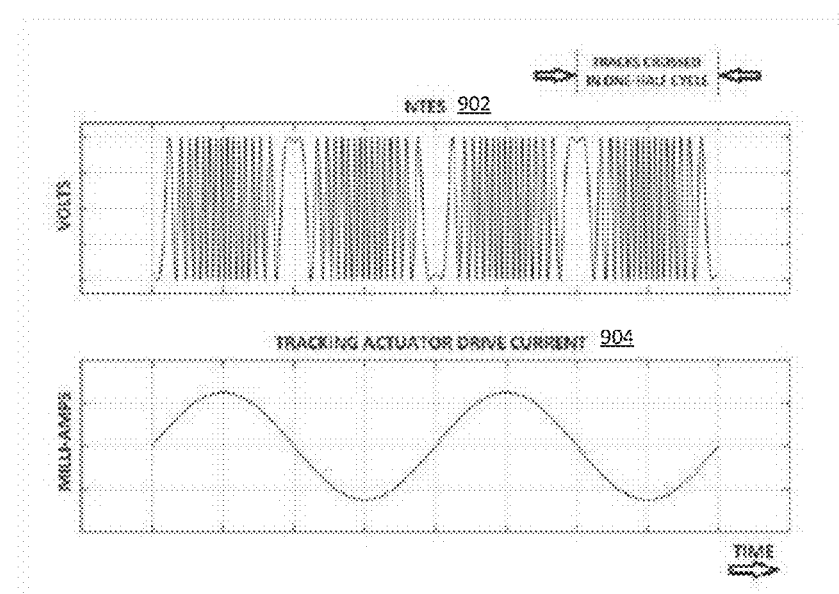
FIG. 9B illustrates NTES track crossings in response to a sinusoidal drive current in accordance with one or more embodiments.

The resonant frequency may be measured as follows. The system drives the tracking actuator coil with a test signal. The test signal may be a sinusoidal current waveform 904, as illustrated in FIG. 9B. The system may drive the tracking actuator coil at frequencies at and around the first resonance of the actuator. The first resonance of the actuator may be, for example, around 50 Hz. The closer the frequency of the stimulus current is to the resonant frequency of the tracking actuator, the more track crossings may be observed.

Based on the applied test signal, the system generates tracking error signals 902. The tracking error signals include several track crossings per driving waveform cycle, as generally shown in FIG. 9B.

The system may acquire data comprising several cycles of drive current and tracking error signal waveforms. The data may be digitally acquired, via electronics in the tape drive. Using the data, the system may determine the resonant frequency. The system may determine the resonant frequency by counting the number of tracks crossed within one cycle of the driving waveform. The system may count the number of tracks crossed within a fixed number of multiple cycles of the driving waveform.

Figure 9C:
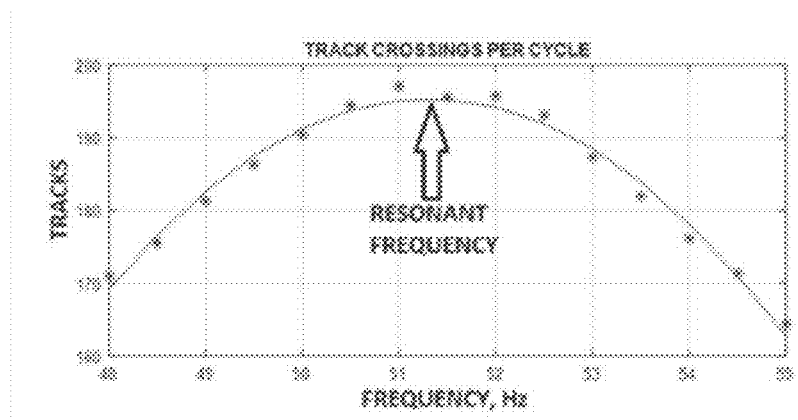
FIG. 9C illustrates track crossing events at the resonant frequency in accordance with one or more embodiments.

Using the track crossings per cycle, the system may determine the resonant frequency as shown in FIG. 9C. The measured data is fit to a curve. As shown in FIG. 9C, a second-order curve fit to the measured data yields the resonant frequency of the spring/mass system. The number of track crossings can be expressed as:

$$a_2 \cdot f^2 + a_1 \cdot f + a_0 \qquad (7)$$

where the resonant frequency is $f_0 = a_1/(2 \cdot a_2)$.

In an embodiment, the system determines the motor constant of the actuator dynamics (Operation 804). The system may determine the motor constant by combining a measurement of actuator displacement x with the spring constant measurement above. The system applies a constant current to the actuator. When the actuator is stimulated by a constant current, the spring force and the motor torque are equal at steady-state:

$$k_m \cdot I = k_s \cdot x \qquad (8)$$

where I is the direct current (DC) drive current and x is the displacement of the actuator from the neutral position. The spring force and motor torque are equal, not only near the resonant frequency, but also at frequencies significantly lower than the resonant frequency. The equation may be rearranged as:

$$\frac{k_m}{m} = \frac{x}{I} \cdot \frac{k_s}{m} = \frac{x}{I} \cdot \omega_0^2 \qquad (9)$$

The system may measure the displacement factor x/I or dx/dI by applying a sinusoidal current to the actuator and measuring the response. A sinusoidal current of approximately 2 Hz is suitable to apply to the system to measure dx/dI.

Based on the applied test signal, the system generates tracking error signals 902. The tracking error signals include several track crossings per driving waveform cycle, as shown in FIG. 9B. The system may acquire data comprising several cycles of drive current and tracking error signal waveforms. The data may be digitally acquired, via electronics in the tape drive. The system may count the number of tracks crossed within a fixed number of multiple cycles of the driving waveform.

Figure 9D:
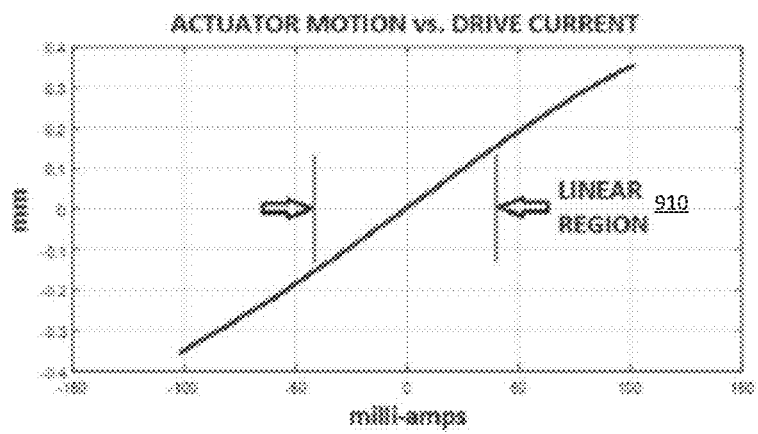
FIG. 9D illustrates steady state lens displacement vs. drive current in accordance with one or more embodiments.

To measure the displacement, x, the system may obtain track crossing information in the tracking error signal from fixed optical media (or optical tape). A typical track pitch for the optical tape is 320 nm. Each cycle of the tracking error signal waveform represents 320 nm of tracking actuator motion. The resulting NTES waveforms 902 are shown in FIG. 9B. The waveforms may be electronically analyzed to yield a curve of x vs. I as illustrated in FIG. 9D. A straight-line curve fit algorithm is applied to the linear region 910 of the measurement data. The slope of the linear region 910 is dx/dI. The dx/dI value can be combined with $\omega_0^2$ in Equation (9) above to obtain $k_m/m$.

In an embodiment, the system determines the damping constant of the actuator dynamics (Operation 806). The system may determine the damping constant by analyzing the current step response of the actuator. The system may analyze the current step response of the actuator by applying a sinusoidal current to the actuator, using the OPU and fixed media, to determine displacement in the tracking direction.

Figure 9E:
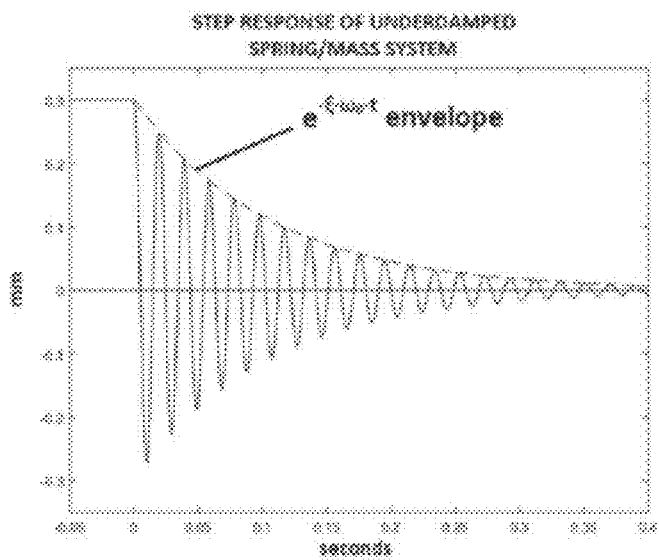
FIG. 9E illustrates the step response of an under-damped spring-mass system in accordance with one or more embodiments.

For an under-damped spring-mass system, the oscillations decay according to an inverse exponential function, as shown in FIG. 9E, where $$\zeta = \frac{k_d}{m}\frac{1}{2\omega_0} \qquad (10)$$

The system may measure the damping factor $k_d/m$ by activating an OPU with focus locked on stationary media, such as the stationary optical tape pictured in FIG. 9A. The system may temporarily apply a DC to move the tracking actuator off of center. The system then removes the actuator current, while the lens position is measured over a period of time. The lens position may be measured, for example, over approximately 0.5 seconds. The lens position may be measured by counting track crossing cycles and converting the track crossing cycles to a distance, using the track pitch (i.e., 320 nm/cycle). The system may analyze the relationship between time and the natural log (ln) of distance travelled for each cycle of damped oscillation time. The system may perform a least squares line fit of the data. The slope of the line fit yields the damping factors $\zeta$ and $k_d/m$.

In an embodiment, the system derives a mathematical model for estimating movement of the optical head as a function of the determined parameters of the actuator dynamics (Operation 808). The system may input the obtained values of $k_s/m$, $k_m/m$, and $k_d/m$ into Equation (5) above. The system may convert Equation (5), the differential equation of the dynamics of the actuator, to a transfer function (similar to Equation (1)) using a Laplace transform.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 1010. Volatile media include dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for compensating a tracking error signal offset, the method comprising the steps of:
   detecting an initial control signal for controlling movement of an optical head across a surface of a tape;
   computing an estimated movement of the optical head based on the initial control signal;
   based on the estimated movement of the optical head, determining a tracking error signal offset;
   measuring a lateral position of the optical head with respect to a width of a data track subsequent to application of the initial control signal;
   based on the measured lateral position of the optical head, determining a tracking error signal;
   applying the tracking error signal offset to the tracking error signal, to obtain a modified tracking error signal; and
   using the modified tracking error signal as a new control signal for controlling additional movement of the optical head.

2. The method of claim 1, wherein determining the tracking error signal offset comprises using the estimated movement to query a look-up table mapping movement values to corresponding tracking error signal offset values.

3. The method of claim 2, wherein the method further comprises generating the look-up table at least by:
   applying a plurality of control signals to control movement of the optical head;
   detecting a plurality of tracking error signal values, generated subsequent to each movement resulting respectively from the plurality of control signals, to obtain a plurality of detected tracking error signal values;
   subsequent to each movement resulting respectively from the plurality of control signals:
     computing a plurality of target tracking error signal values based on a plurality of lateral positions of the optical head, with respect to a width of one or more data tracks;
   computing a plurality of tracking error signal offset values based on a difference between each of the plurality of detected tracking error signal values and an associated target tracking error signal value from the plurality of target tracking error signal values;

storing a mapping between a distance value for each movement resulting respectively from the plurality of control signals and respective tracking error signal offset value.

4. The method of claim 3, wherein the method further comprises determining the distance value of a particular movement at least by:
    determining a number of tracks on the tape that the optical head has moved across during the particular movement;
    multiplying (a) a track width of tracks of the tape by (b) the number of tracks.

5. The method of claim 1, further comprising the steps of:
    applying a plurality of signals to control movement of the optical head;
    measuring a plurality of movements, of the optical head, corresponding respectively to the plurality of signals;
    deriving a mathematical model for estimating movement, of the optical head, as a function of signal values;
    wherein computing the estimated movement is performed using the mathematical model.

6. The method of claim 5, wherein deriving the mathematical model is performed using a Least Squares Regression (LSR) method.

7. The method of claim 1, further comprising the steps of:
    determining a resonant frequency of actuator dynamics that move the optical head;
    using the determined resonant frequency of the actuator dynamics, calculating a spring constant of the actuator dynamics;
    using the calculated spring constant of the actuator dynamics, deriving a mathematical model for motion of the actuator dynamics as a function of an applied signal;
    wherein computing the estimated movement is performed using the mathematical model.

8. The method of claim 7, wherein deriving the mathematical model further comprises determining (a) a damping constant of the actuator dynamics and (b) a motor constant of the actuator dynamics to be used in the mathematical model used for computing the estimated movement.

9. The method of claim 1, wherein applying the tracking error signal offset to the tracking error signal comprises incrementing or decrementing the tracking error signal based on the tracking error signal offset.

10. The method of claim 1, wherein the method further comprises: filtering the initial control signal with a low pass filter prior to computing the estimated movement of the optical head based on the initial control signal.

11. A non-transitory computer readable medium comprising instructions which, when executed by one or more hardware processors, causes performance of operations comprising:
    detecting an initial control signal for controlling movement of an optical head across a surface of a tape;
    computing an estimated movement of the optical head based on the initial control signal;
    based on the estimated movement of the optical head, determining a tracking error signal offset;
    measuring a lateral position of the optical head with respect to a width of a data track subsequent to application of the initial control signal;
    based on the measured lateral position of the optical head, determining a tracking error signal;
    applying the tracking error signal offset to the tracking error signal, to obtain a modified tracking error signal; and
    using the modified tracking error signal as a new control signal for controlling additional movement of the optical head.

12. The medium of claim 11, wherein determining the tracking error signal offset comprises using the estimated movement to query a look-up table mapping movement values to corresponding tracking error signal offset values.

13. The medium of claim 12, wherein the operations further comprise generating the look-up table at least by:
    applying a plurality of control signals to control movement of the optical head;
    detecting a plurality of tracking error signal values, generated subsequent to each movement resulting respectively from the plurality of control signals, to obtain a plurality of detected tracking error signal values;
    subsequent to each movement resulting respectively from the plurality of control signals:
        computing a plurality of target tracking error signal values based on a plurality of lateral positions of the optical head, with respect to a width of one or more data tracks;
    computing a plurality of tracking error signal offset values based on a difference between each of the plurality of detected tracking error signal values and an associated target tracking error signal value from the plurality of target tracking error signal values;
    storing a mapping between a distance value for each movement resulting respectively from the plurality of control signals and respective tracking error signal offset value.

14. The medium of claim 11, wherein the operations further comprise:
    applying a plurality of signals to control movement of the optical head;
    measuring a plurality of movements, of the optical head, corresponding respectively to the plurality of signals;
    deriving a mathematical model for estimating movement, of the optical head, as a function of signal values;
    wherein computing the estimated movement is performed using the mathematical model.

15. The medium of claim 11, wherein the operations further comprise:
    determining a resonant frequency of actuator dynamics that move the optical head;
    using the determined resonant frequency of the actuator dynamics, calculating a spring constant of the actuator dynamics;
    using the calculated spring constant of the actuator dynamics, deriving a mathematical model for motion of the actuator dynamics as a function of an applied signal;
    wherein computing the estimated movement is performed using the mathematical model.

16. A system comprising:
    at least one device including an optical head;
    the system configured to perform operations comprising:
        detecting an initial control signal for controlling movement of the optical head across a surface of a tape;
        computing an estimated movement of the optical head based on the initial control signal;
        based on the estimated movement of the optical head, determining a tracking error signal offset;
        measuring a lateral position of the optical head with respect to a width of a data track subsequent to application of the initial control signal;
        based on the measured lateral position of the optical head, determining a tracking error signal;

applying the tracking error signal offset to the tracking error signal, to obtain a modified tracking error signal; and using the modified tracking error signal as a new control signal for controlling additional movement of the optical head.

17. The system of claim 16, wherein determining the tracking error signal offset comprises using the estimated movement to query a look-up table mapping movement values to corresponding tracking error signal offset values.

18. The system of claim 17, wherein the operations further comprise generating the look-up table at least by:

applying a plurality of control signals to control movement of the optical head;

detecting a plurality of tracking error signal values, generated subsequent to each movement resulting respectively from the plurality of control signals, to obtain a plurality of detected tracking error signal values;

subsequent to each movement resulting respectively from the plurality of control signals:

computing a plurality of target tracking error signal values based on a plurality of lateral positions of the optical head, with respect to a width of one or more data tracks;

computing a plurality of tracking error signal offset values based on a difference between each of the plurality of detected tracking error signal values and an associated target tracking error signal value from the plurality of target tracking error signal values;

storing a mapping between a distance value for each movement resulting respectively from the plurality of control signals and respective tracking error signal offset value.

19. The system of claim 16, wherein the operations further comprise:

applying a plurality of signals to control movement of the optical head;

measuring a plurality of movements, of the optical head, corresponding respectively to the plurality of signals;

deriving a mathematical model for estimating movement, of the optical head, as a function of signal values;

wherein computing the estimated movement is performed using the mathematical model.

20. The system of claim 16, wherein the operations further comprise:

determining a resonant frequency of actuator dynamics that move the optical head;

using the determined resonant frequency of the actuator dynamics, calculating a spring constant of the actuator dynamics;

using the calculated spring constant of the actuator dynamics, deriving a mathematical model for motion of the actuator dynamics as a function of an applied signal;

wherein computing the estimated movement is performed using the mathematical model.

* * * * *

UNITED STATES PATENT AND TRADEMARK OFFICE
CERTIFICATE OF CORRECTION

PATENT NO. : 9,959,900 B1
APPLICATION NO. : 15/665311
DATED : May 1, 2018
INVENTOR(S) : Wilson et al.

Page 1 of 1

It is certified that error appears in the above-identified patent and that said Letters Patent is hereby corrected as shown below:

On the Title Page

Under Notice, Line 3, delete "days. days." and insert -- days. --, therefor.

In the Specification

In Column 12, Line 1, delete "$e^{j\omega}$" and insert -- $e^{j\omega_i}$ --, therefor.

In Column 12, Line 6, delete "$p_1^{n-2}$" and insert -- $p_i^{n-2}$ --, therefor.

In Column 12, Line 36, delete "$p_{N-1}^{m-1}$" and insert -- $p_N^{m-1}$ --, therefor.

In Column 14, Line 12, delete "$=a_1$" and insert -- $=-a_1$ --, therefor.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*